(12) United States Patent
Wilson

(10) Patent No.: US 11,450,231 B2
(45) Date of Patent: Sep. 20, 2022

(54) MATH ROLL, AN AID FOR DISPLAYING MATH INFORMATION/FACTS

(71) Applicant: Mark Jonathan Wilson, N. Potomac, MD (US)

(72) Inventor: Mark Jonathan Wilson, N. Potomac, MD (US)

( * ) Notice: Subject to any disclaimer, the term of this patent is extended or adjusted under 35 U.S.C. 154(b) by 58 days.

(21) Appl. No.: 17/228,772

(22) Filed: Apr. 13, 2021

(65) Prior Publication Data

US 2021/0233426 A1 Jul. 29, 2021

Related U.S. Application Data

(62) Division of application No. 16/104,078, filed on Aug. 16, 2018, now abandoned.

(51) Int. Cl.
*G09B 19/02* (2006.01)
*G09B 1/24* (2006.01)

(52) U.S. Cl.
CPC ............. *G09B 19/02* (2013.01); *G09B 1/24* (2013.01)

(58) Field of Classification Search
CPC .................................. G09B 1/24; G09B 19/02
See application file for complete search history.

(56) References Cited

U.S. PATENT DOCUMENTS

| | | | | |
|---|---|---|---|---|
| 2002/0009697 | A1* | 1/2002 | Phan ..................... | G09B 19/02 434/188 |
| 2006/0024649 | A1* | 2/2006 | Vernon ................... | G09B 7/02 434/201 |
| 2007/0048700 | A1* | 3/2007 | Fluster .................. | G09B 19/02 434/188 |
| 2007/0218433 | A1* | 9/2007 | Vanova ................ | G09B 19/025 434/188 |
| 2007/0275357 | A1* | 11/2007 | Resor ..................... | G09B 19/02 434/201 |
| 2010/0285437 | A1* | 11/2010 | Radas .................... | G09B 19/02 434/210 |
| 2014/0045153 | A1* | 2/2014 | Cornell ................ | G09B 19/025 434/201 |
| 2021/0233426 | A1* | 7/2021 | Wilson ................... | G09B 19/02 |

* cited by examiner

*Primary Examiner* — Nathan Hillery
(74) *Attorney, Agent, or Firm* — Hilary J. Sumner

(57) ABSTRACT

A math aid that strengthens addition, subtraction, multiplication and division skills as well as math memory. Math facts are displayed on two stuffed rolls using horizontal strips, color differences, various digit sizes and a roll shape all used to increase ease and focus on seeing selected facts for a math problem. Each roll displays numbers in a horizontal row for counting and subtracting. One of the rolls displays a column of even multiplicands, a row of multipliers, and corresponding rows of quotients. The second roll has a similar display but provides a column of odd multiplicands. In using the aid, one selects the facts needed by rotating the roll to the strip of facts needed, then flattening the roll enough to hold its position to see those needed facts.

7 Claims, 2 Drawing Sheets

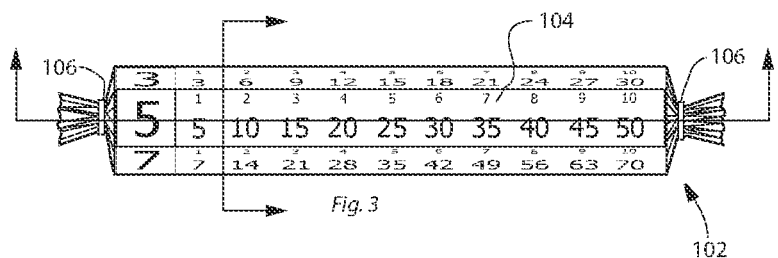
Fig. 2b
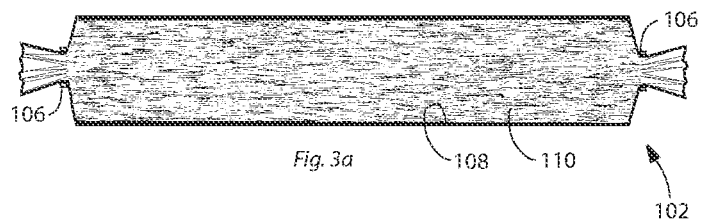
Fig. 3
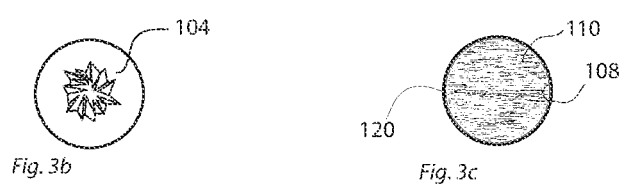
Fig. 3a
Fig. 3b
Fig. 3c

MATH ROLL, AN AID FOR DISPLAYING MATH INFORMATION/FACTS

CROSS REFERENCE TO RELATED APPLICATIONS

This divisional application claims benefit of priority from U.S. Non-provisional application Ser. No. 16/104,078 submitted by pro se inventor Mark Jonathan Wilson, filed Aug. 16, 2018, entitled MATH ROLL, AN AID FOR DISPLAYING MATH INFORMATION/FACTS. ON TWO SEMI-SOFT ROLL SHAPES, HAVING A SLIGHTLY DEFORMABLE CONSTRUCTIONS, THAT ONE ROTATES AND POSITIONS BY HAND TO ACCESS USEFUL INFORMATION/FACTS, the entirety of which is incorporated herein by reference.

STATEMENT REGARDING FEDERALLY SPONSORED RESEARCH/DEVELOPMENT

Not Applicable

PARTIES TO A JOINT RESEARCH AGREEMENT

Not Applicable

REFERENCE TO SEQUENCE LISTING, TABLE OR COMPUTER PROGRAM

Not Applicable

FIELD OF THE INVENTION

The present invention pertains to an educational method and apparatus for displaying and quickly locating rudimentary math facts.

BACKGROUND OF THE INVENTION

This application relates to a math aid for elementary math education and general math use, by displaying selected related digits—math facts—on a semi-soft roll shape. The path to learning elementary math begins with learning the base 10 number sequence, as well as addition, subtraction, multiplication and division facts and operations. Math instruction in elementary schools typically introduces and or displays in the classroom three, two-dimensional aids: a linear sequence of digits (1 through 100), a linear sequence of digits displayed on 10 rows with row one being 1 to 10, followed by row two with digits 11 to 20, then row three with 21 to 30, and so forth, to 91 to 100, and a multiplication table with rows and columns displaying all the multiplication combinations for digits 1 through 10, times digits 1 through 10. These three aids help provide facts about the base 10 symbols, their names, their sequence, mathematical relationships to each other, and the four basic math operations: addition, subtraction, repeat addition (multiplication) and repeat subtraction (division).

The math roll invention displays two of those aides on the rolls: a number sequence between 1 and 20, and the multiplication table's facts, but in a different manner by displaying those facts within horizontal strips. To display the math sequences and multiplication facts, they are placed on two semi-soft rolls within horizontal strips, so that one may rotate the rolls to see the math facts needed for the operations, while at the same time limiting the view of the other facts not needed, thus increasing ones focus on what was selected, similar to what happens when one places a ruler or paper under a text line on a dense written page to increase focus by limiting the view of other words. Additionally, as with a ruler or paper examples, positioning the roll's tight curved shape towards one's vision, functions as a place holder for that information, useful when one returns from looking elsewhere for a moment, while working for example on a long division problem.

Adding and Subtracting Operations

In the child's learning process most children will at some time count on their fingers to add or subtract numbers until the child has a memory of the number facts for adding and subtracting. The finger counting is used for several reasons like, there is no number sequence display available, or the child is taught that method, or it has become a personal habit or convenience. This process involves saying aloud or in one's mind the numbers in sequence while keeping track of the change by adding or subtracting through counting on one's fingers. A short fall to the method, is that not all the senses are involved to help remember the results for future use. Senses like seeing the actual digits and touching them while saying them engages more senses and is a preferred method, but sometimes there is not a display available or handy. Additionally, as one gets better at using the math roll invention, one will start utilizing the additional graphic device of the circled even numbers, to skip count more quickly by twos.

Multiplying and Dividing Operations

Often a child's learning of multiplication begins with adding together groups of the same number of items like 7 bags with 5 apples in each bag, means there are 35 apples among the bags. Over time the child will memorize the relationship between 7 times 5 equals 35, and conversely with division learn 7 divided into 35 equals 5 equal parts. At some point the child will memorize the relationship between these three digits 7, 5, and 35 for multiplying and dividing operations. Later, one will memorize all the other relationships that are in a typical multiplication table for both multiplying and division, base 10 operations.

The multiplication table, is a typical aid to learning the multiplication facts. In finding what two numbers multiplied together would equal, one finds first those two numbers on the table, one among the columns at the top (the first factor or multiplier) and other among the rows to the left (the second factor or multiplicand). Next, one traces into the table's field in two directions, either across and down or down and across from those two numbers to find where the paths intersect to find the product of multiplication. In division one would find the quotient in the field to be divided and trace from it, back to the top number in that column and the first number in that row to the left for two numbers that will be divided evenly into it. Both multiplication and division operations with the table involve this double tracing movement, horizontally and vertically across the table and sometimes one ends up retracing them again if distracted, or one has to retrace it repeatedly when doing multiplication or division with multi-digit numbers in the operation. In the latter case, one switches back and forth between finding a number to plug into, say a long division problem, then subtracts it from another number, then returns back again to the table and then looks for the next number to plug in. This process of looking back and forth can cause confusion and mistakes.

On the other hand, the math roll invention simplifies this process by keeping one factor at the start of a row, and then placing the other factor in a smaller font size just above each product or quotient, thus eliminating the need to vertically trace upward to know what the second factor is. This makes the task, for some struggling children and adults, quicker, and less cumbersome especially for anyone with learning disabilities, who has difficulty visually tracking data on a page or a table.

As a result of eliminating the double tracking process, with using this horizontal strip display, one begins to see the true concept that multiplication is simply repeated addition, because the pattern visually emerges, with the three numbers closer together. The strip begins going left to right, for example, with the factor (or multiplicand) 7, large and prominent, followed by products of the 7 like: 7, 14, . . . 70. Above each of these products, in a smaller font size, are the other factors (or multipliers) of the products: 1, 2, . . . 10. One can clearly see the repeat addition pattern and the factors involved.

Another added advantage of the horizontal strip display is the ability to select and add the products together using the strip's numbers in a unique manner, like in the operation of 7×37, one would glance across the strip and see that 7×3 equals 21, and therefore 7×37 (7×30+7×7) would be 210+49 or 259 as opposed to multiplying it out on paper. Similarly, 7×58 (7×50+7×8) would be 350+56 or 406, and 7×496 would be 2800+630+42 or 3,472. Even larger numbers can be done like 67×2,975, which would be 120,000+54,000+ 4,200+300 (178,500)+14,000+6,300+490+35 (20,825) or 199,325.

The math roll invention splits the 10 rows for multiplication facts into two groups, with one roll displaying the start of a row with the even numbers 2, 4, 6, 8, 10, that are factors, and another roll displaying the start with odd numbers 1, 3, 5, 7, 9, that are factors, which reinforces the concept that there are differences between even and odd numbers. Furthermore, the splitting helps give the roll a smaller diameter thus naturally hiding more of the rows of numbers not needed at the time.

Another typical aid not mentioned before, that is found in the classrooms and homes is the electronic hand held calculator, where one presses a digit, an operation key, another digit, and another operation key to find a result, that will be displayed on a screen until the next inquiry is started. On some calculators both the digits, the operation symbols and the answer are displayed on the screen, while on others only the digit(s) and the answer are displayed at any given time. Unlike the multiplication table or the math roll invention, the electronic hand held calculator, does not display all the other combinations of number pairs that multiply to make for example the number 36. Nor does the machine show the sequence of repeat addition that this invention displays and which gives users a better understanding and feeling for numbers, a sense that the answer is correct. The electronic hand held calculator also requires one to follow machine operation sequences of rules which some children have difficulty mastering and remembering.

ADVANTAGES OVER PRIOR-ART

An improvement with adding and subtracting operations is to have a horizontal sequence of digits say, 1 to 20 in front of one's eyes, while working a problem, where one can see for example that 5 from 17 would be 12 by seeing it, touching each digit 17, 16, 15, 14, 13, 12, and saying 17 minus 1, 2, 3, 4, 5, brings one to number 12. Using these three senses, touching the numbers, seeing the change, and saying the numbers, all combines to reinforce the memory of those number relationships: 5, minus 17, is 12, or that 5+12=17, which leads to more cognitive involvement, making more of an imprint in the mind in remembering these facts. When counting one's fingers, one misses seeing the actual numbers and number relationships.

The improvements of using this invention, the math roll, over the printed multiplication table is by eliminating the double tracing effort common with tables, in favor of a glancing effort over a strip of a few numbers, in which the factors and their product numbers are placed closer together, therefore, reinforcing the concept that multiplication is repeating addition. Switching from a typical multiplication table's 2-dimensional display to a 3-dimensional roll display that hides or partially hides non-selected facts, reduces data overload, improving focus, making the tracking of numbers easier. This invention helps establish a new method of multiplying, where one quickly selects products to add together when multiplying one or more digits times other multi-digit numbers, thus encouraging people to use their minds in a different way and/or have options for solving problems.

In the case of an improvement over the handheld calculator, the invention displays more of the math process and options with its display. For example in the operation 8×48, the calculator would display the results 384, while the invention displays more of the process like: 8×4=32 and 8×8=64, and if we multiply the 32×ten then the final answer would be 320+64 or 384. Seeing the steps of the process lends itself to having an intuitive feeling for numbers and a sense of them, because in this operation one is building numbers by steps; however, with the calculator, those steps are not shown. Furthermore, unlike an electronic hand held calculator, in the operation of dividing 34 by 5 the math roll displays all the multiples of five including those near the number 34, so one may choose between the digits 30 (5×6) or 35 (5×7) to process the math problem. In cases like 4,672 divided by 7 the invention displays all the options for dividing into that number like 7, 14, 21, 28, 35, 42, 49, 56, 63, so one uses these values, 4,200, 420, and 49, to get the quotient 667 remainder 3.

A third improvement over both a printed multiplication table and a handheld calculator, is that this invention splits the math facts into two sets on separated displays on two rolls: one pertaining to multiples of the even numbers 2, 4, 6, 8, 10, and the other multiples of odd numbers 1, 3, 5, 7, 9, both times 1 to 10 or more. The purpose is to convey math patterns, (1) that an even number times an even number, or an even number times an odd number always produce an even number and (2) that an odd number times an odd number always produces an odd number. This pattern is important, because when one encounters an odd number and wishes to find its factor family, one would begin the inquiry with odd numbers. For example with the number 63 the odd digits of the factor family are 7, 9 or the number 27 has a factor family of 9, 3. As one uses the math roll, other mathematical patterns become evident. This math aid make it easier to see those patterns.

SUMMARY

A hand rotated math educational aid:
  a. The roll shape displays educational math facts, and
  b. the roll is placed in a selected position while on a flat level surface to display the chosen information, and it can be pressed down to form it into an oval so that it stays put and one's hands are free, till one wants to rotate it to another position, and
  c. the roll's curved surface highlights the selected information while also partially limiting some and fully hiding other non-selected information from view, and
  d. the information is displayed horizontally across the roll, and
  e. addition and subtraction, numerical facts digit sequence of 1 to 20 or greater are displayed horizontally, starting with the digit one going from left to right, and the even numbers are enclosed in a circle, and
  f. multiplication and division facts are displayed horizontally, and
  g. one roll of the two roll set horizontally displays even factors 2, 4, 6, 8, 10; the factors they combine with, 1 to 10 or greater; and their products; while another roll of the set has odd factors 1, 3, 5, 7, 9; the factors they combine with, 1 to 10 or greater; and their products, and
  h. the factors and products referred to in specifications g. are of three different font sizes by grouping, with the even and odd group numbers (or multiplicands) on the far left side 2, 4, 6, 8, 10, and 1, 3, 5, 7, 9, being the largest font size and the numbers (or multipliers) 1, 2, 3, 4, 5, 6, 7, 8, 9, 10 or greater above the products on each roll being the smallest font size, and the product (or quotient) numbers, the third group, being a font size between the two mentioned largest and smallest sizes, and
  i. the largest font size numbers, the multiplicands: 2, 4, 6, 8, 10, and 1, 3, 5, 7, 9, referred to in specifications h. are arranged vertically around the roll with one number per horizontal line beginning with the lowest number to the highest, placed top to bottom, and placed to the far left position on the roll, and
  j. the second grouping of numbers, the multipliers: 1, 2, 3, 4, 5, 6, 7, 8, 9, 10 referred to in specifications h. are placed horizontally from left to right, to the right of the largest font size number referred to in specifications i, and
  k. the third grouping of numbers, the products (or quotients), named in specifications h. are placed horizontally under each of the smallest font size numbers 1, 2, 3, 4, 5, 6, 7, 8, 9, 10, and
  l. the numbers displayed horizontally referred to in specification g, h, i, j, k, may be with colored or shaded backgrounds to separate that display line from either or both the lines that are above it or below it.

DESCRIPTION OF DRAWINGS

FIG. 2*b* is a plan view of the other half of the selected multiplication and division facts and the addition and subtraction facts before it is shaped into a roll.

FIG. 3 is a side view of the roll shape, using FIG. 2*b* displayed facts, according to one aspect of the invention.

FIG. 3*a* is a cross section through the length of the roll shape according to one aspect of the invention.

FIG. 3*b* is an end view of the roll shape according to one aspect of the invention.

FIG. 3*c* is a cross section through the diameter of the roll shape according to one aspect of the invention.

DETAILED DESCRIPTION

Figures 1, 2A:
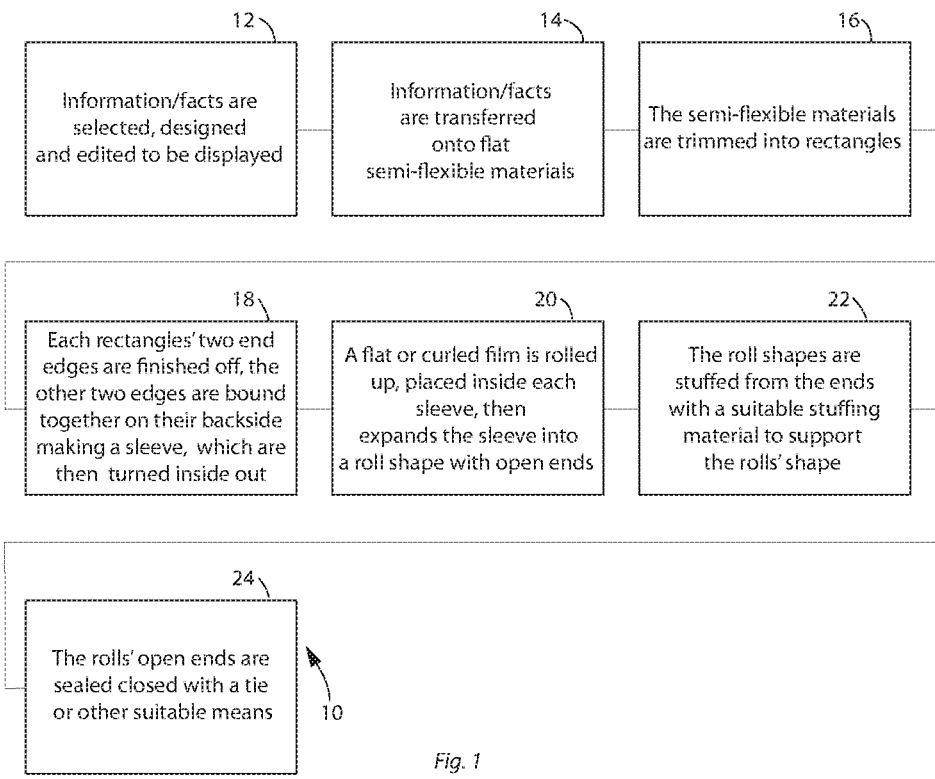
FIG. 1 is a block diagram of summarized steps for making an educational aid on semi-soft rolls having deformable construction.
FIG. 2*a* is a plan view of half of the selected multiplication and division facts, and the addition and subtraction facts before it is shaped into a roll.

Referring first to FIG. 1. According to at least one aspect of the invention, information/facts on semi-soft rolls having a deformable construction are made using the following method 10. In the first step 12, the information/facts to be displayed on the rolls is selected, edited and designed for the roll shapes as seen in 100 of the FIGS. 2*a* and 2*b*, and ready to transfer to the rolls' exterior substrate material. Second step 14, the information/facts are transferred onto a flat semi-flexible substrate materials 104 of FIG. 3 making an exterior materials. Next, step 16, the exterior materials with the printed information/facts, 104 of FIG. 2*a*, 2*b* is trimmed to suitable two dimensions like a rectangles. In step 18, for each roll the exterior material's FIG. 3, 102 two edges are finished off and the other two edges are attached together lengthwise on the material's backside, making the material into a sleeve with two finished open ends, followed by turning the sleeve outside out in to hide the lengthwise attachment. Step 20, a flat or curled film is rolled up tightly, inserted into each sleeves, and then allowed to expand to give the sleeve a semi-flexible roll shape. Step 22, the roll shapes may be stuffed with any suitable stuffing material, to further support the roll's shape. The stuffing material may be inserted into the rolls' mostly closed interior using either open end of the rolls. Final step 24, the rolls' ends may be sealed with a tie or other suitable means to seal the ends. The method 10 may result in one finding, and referring back and forth to the facts in an easier manner.

FIG. 2*a*, is the printed information/facts of sequences of numbers, and multiplication facts displayed in five horizontal strips beginning with 2 to 10 in even numbers on the far left side. Item 100, is the display of printed facts on the exterior semi-flexible material before being shaped into its final form of a roll.

FIG. 2*b*, is the printed information/facts of sequences of numbers, and multiplication facts displayed on five horizontal strips beginning with 1, to 9 in odd numbers on the far left side. Item 100, is the display of printed facts on the exterior semi-flexible material before being shaped into its final form of a roll.

FIG. 3, is an exterior view of the roll. Item 102 is the roll with FIG. 2*b* facts partially displayed. Item 104, is the flexible material in final form with printed information designed with about ⅙th of the roll's information played full size. In FIG. 3*a*, item 106, is a tie to seal the roll's ends.

FIG. 3*a*, is a lengthwise section through the roll item 102 of FIG. 3. Item 108, is a flat or curled film that is slightly deformable, when pressed, lining the inside of the roll. Item 110 is stuffing material.

FIG. 3*b*, is the exterior view of the roll item 102, showing its end view and the gathering of the end material. Item 104, is the flexible exterior material in final form is that view.

FIG. 3*c*, is a cross section through the roll item 102.

The invention claimed is:

1. A math aid for elementary math education comprising a table of multiplication facts placed on a semisoft and cylindrically shaped surface having a circumference and a longitudinal axis, wherein said multiplication facts are comprised of multiplicands, multipliers, and products, and wherein said multiplicands are arranged in a single column and arranged about the circumference of the semi-soft and cylindrically shaped surface, and wherein the multipliers and products associated with each multiplicand and multiplier are arranged in a corresponding row along the longitudinal axis of said semi-soft and cylindrically shaped surface.

2. The math aid of claim 1, wherein said multiplicands are limited to even numbers.

3. The math aid of claim 1, wherein said multiplicands are limited to odd numbers.

4. The math aid of claim 1, wherein the multiplicand is displayed in a large font size and the multiplier is displayed in a smaller font size as compared to the font size of the multiplicand within said multiple rows of multiplication facts.

5. The math aid of claim 1, wherein said multiple rows of multiplication facts have alternating coloration or shading.

6. The math aid of claim 1, further comprising a row of sequential numbers from at least 1 to 20, wherein even numbers within said row of sequential numbers are circled.

7. A method of focusing a user's attention on a set of multiplication facts, said method comprising:

a. Providing a semi-soft and cylindrically shaped surface having a circumference and a longitudinal axis;

b. Displaying multiplicands in a column, about the circumference of said semi-soft and cylindrically shaped surface;

c. Displaying multipliers and corresponding products associated with each multiplicand and multiplier in a row along the longitudinal axis of said semi-soft and cylindrically shaped surface;

d. Identifying an area of interest by selecting a row and column corresponding to the multiplication facts of interest; and e. Flattening said area of interest using a tool or a hand of the user to limit the display of multiplication facts to the area of interest.

* * * * *